US012186788B2

(12) United States Patent
Cecere et al.

(10) Patent No.: US 12,186,788 B2
(45) Date of Patent: Jan. 7, 2025

(54) FURNACE FOR HEATING METAL STRIPS, AND DEVICE AND METHOD FOR PRODUCING METAL STRIPS BY CONTINUOUS CASTING AND ROLLING

(71) Applicant: SMS Group GmbH, Düsseldorf (DE)

(72) Inventors: Cosimo Andreas Cecere, Langenfeld (DE); Matthias Peters, Kreuztal (DE); Thomas Runkel, Siegen (DE)

(73) Assignee: SMS GROUP GMBH, Düsseldorf (DE)

( * ) Notice: Subject to any disclaimer, the term of this patent is extended or adjusted under 35 U.S.C. 154(b) by 493 days.

(21) Appl. No.: 16/461,123

(22) PCT Filed: Nov. 10, 2017

(86) PCT No.: PCT/EP2017/078971
§ 371 (c)(1),
(2) Date: May 15, 2019

(87) PCT Pub. No.: WO2018/091381
PCT Pub. Date: May 24, 2018

(65) Prior Publication Data

US 2020/0070225 A1 Mar. 5, 2020

(30) Foreign Application Priority Data

Nov. 17, 2016 (DE) ..................... 10 2016 222 692.4
Jun. 27, 2017 (DE) ..................... 10 2017 210 850.9

(51) Int. Cl.
*B21B 1/46* (2006.01)
*B21B 45/00* (2006.01)
(Continued)

(52) U.S. Cl.
CPC ............ *B21B 1/463* (2013.01); *B21B 45/004* (2013.01); *B26D 7/32* (2013.01);
(Continued)

(58) Field of Classification Search
CPC .................. B21B 1/463; B21B 45/004; B21B 2015/0014; B26D 7/32; B26D 7/10;
(Continued)

(56) References Cited

U.S. PATENT DOCUMENTS 3,492,853 A * 2/1970 John .................. B21B 15/0007 72/203
4,022,088 A * 5/1977 Stotzel ................ B23D 15/005 83/34
(Continued)

FOREIGN PATENT DOCUMENTS

DE 195 24 082 A1 1/1997
DE 10 2008 003 222 A1 3/2009
(Continued)

OTHER PUBLICATIONS

International Search Report issued on Feb. 16, 2018 in corresponding International application No. PCT/EP2017/078971; 7 pages.
(Continued)

*Primary Examiner* — Jonathan G Riley
(74) *Attorney, Agent, or Firm* — Maier & Maier, PLLC

(57) ABSTRACT

A furnace for heating metal strips, and to a device and a method for producing metal strips by continuous casting and rolling. The device includes a casting machine, a furnace through which a metal strip can be transported in a conveying direction, a first external cutting apparatus and a second external cutting apparatus, the first external cutting apparatus being upstream of the furnace and the second external cutting apparatus being downstream of the furnace, in the conveying direction of the metal strip, and at least one rolling mill. A first internal cutting apparatus and a second internal cutting apparatus are provided inside the furnace. A segment of the metal strip between said internal cutting apparatuses can be separated by actuating the latter.

9 Claims, 4 Drawing Sheets

(51) Int. Cl.

| | |
|---|---|
| ***B26D 7/32*** | (2006.01) |
| *B21B 15/00* | (2006.01) |
| *B22D 11/16* | (2006.01) |
| *B26D 7/10* | (2006.01) |
| *F27B 9/20* | (2006.01) |
| *F27B 9/30* | (2006.01) |

(52) U.S. Cl.
CPC ..... *B21B 2015/0014* (2013.01); *B22D 11/163* (2013.01); *B26D 7/10* (2013.01); *F27B 9/20* (2013.01); *F27B 9/30* (2013.01)

(58) Field of Classification Search
CPC . B22D 11/163; F27B 9/20; F27B 9/30; C21D 9/54; C21D 9/0056
See application file for complete search history.

(56) References Cited

U.S. PATENT DOCUMENTS

| | | | | | |
|---|---|---|---|---|---|
| 4,182,146 | A * | 1/1980 | Wladika | C21D 9/68 72/202 |
| 5,065,811 | A * | 11/1991 | Scholz | B21B 1/46 164/460 |
| 5,461,770 | A * | 10/1995 | Kimura | C21D 9/0081 29/527.7 |
| 5,528,816 | A * | 6/1996 | Donini | B21B 1/26 164/417 |
| 6,071,362 | A * | 6/2000 | Mertens | B21B 1/466 148/541 |
| 2006/0243420 | A1 * | 11/2006 | Flemming | B21B 1/46 164/476 |
| 2010/0147484 | A1 * | 6/2010 | Rosenthal | C21D 8/0426 164/462 |
| 2010/0275667 | A1 * | 11/2010 | Seidel | B21B 1/46 72/127 |
| 2011/0056649 | A1 * | 3/2011 | Hohenbichler | B22D 11/1206 164/460 |
| 2016/0175903 | A1 * | 6/2016 | Runkel | B21B 1/24 29/527.7 |

FOREIGN PATENT DOCUMENTS

| | | | | |
|---|---|---|---|---|
| DE | 10 2013 213 418 | A1 | 2/2014 | |
| DE | 102016216727 | A1 * | 3/2018 | B21B 15/0007 |
| EP | 2 287 343 | A2 | 2/2011 | |
| EP | 2 259 886 | B1 | 5/2012 | |
| EP | 2 885 091 | B1 | 10/2016 | |
| WO | 2009/027045 | A1 | 3/2009 | |
| WO | 2015/011248 | A1 | 1/2015 | |
| WO | 2015/110648 | A1 | 7/2015 | |

OTHER PUBLICATIONS

International Preliminary Examination Report on Patentability issued on Apr. 23, 2019 in corresponding International application No. PCT/EP2017/078971; 41 pages including Partial Machine-generated English-language translation.

* cited by examiner

FURNACE FOR HEATING METAL STRIPS, AND DEVICE AND METHOD FOR PRODUCING METAL STRIPS BY CONTINUOUS CASTING AND ROLLING

FIELD

The invention relates to a furnace for heating metal strips, a device for producing metal strips by continuous casting and rolling, and a method for producing metal strips by continuous casting and rolling.

BACKGROUND

The present invention can be used in casting-rolling plants, in which a finished product in the form of a metal strip is produced either discontinuously or in continuous operation from liquid metal. In particular, the invention can be used in casting-rolling plants for producing metal strips in the form of flat-rolled steel, wherein a furnace of such a casting-rolling plant is formed by a roller hearth furnace, for example.

In commonly known casting-rolling plants, it could be provided that, when a malfunction occurs, material is discharged laterally from a roller hearth furnace. For this purpose, so-called tracks can be used, which swivel or are displaced in parallel. However, a continuous material string or metal strip can only be discharged from the roller hearth furnace if the piece of material to be discharged first is separated. In this regard, the state of the art has the disadvantage that, in order to separate the metal strip and to subsequently discharge a separated segment of the metal strip laterally, the material must be moved in the direction of or against its conveying direction in close proximity to a furnace. This results in the requirement that the material must be able to be conveyed or moved on the transport apparatuses before or after the (roller hearth) furnace. However, in particular in the case of casting-rolling plants, which operate continuously, the space on the transporting apparatuses in close proximity to the furnace frequently is occupied by material or strip when a malfunction occurs and can therefore not be used. Thus, the process has to be delayed until these transporting apparatuses are free again. However, the metal strip located outside of the roller hearth furnace at that time cools down during this waiting period, which could then lead to problems with the further production process.

The problem underlying the invention is to optimize the production of metal strips by continuous casting and rolling in such a manner that it is possible to unload or discharge separated segments of the metal strip without requiring additional space on the transporting apparatuses before or after a furnace.

A furnace according to the present invention serves to heat metal strips and comprises a housing, wherein a metal strip can be transported through the housing in a conveying direction. A first internal cutting apparatus and a second internal cutting apparatus are provided inside the housing. The second internal cutting apparatus is arranged at a distance to the first internal cutting apparatus and arranged downstream from the first internal cutting apparatus in a conveying direction of the metal strip. Said internal cutting apparatuses in particular can be actuated simultaneously such as to separate a segment of the metal strip located between the internal cutting apparatuses inside the furnace.

The present invention furthermore provides a device for producing metal strips by continuous casting and rolling, wherein such a device comprises a casting machine, a furnace through which a metal strip can be transported in a conveying direction, a first external cutting apparatus and a second external cutting apparatus, wherein the first external cutting apparatus is arranged upstream of the furnace and the second external cutting apparatus is arranged downstream of the furnace, in the conveying direction of the metal strip, and at least one rolling mill. Herein, the furnace is formed by the aforementioned furnace according to the present invention.

The present invention furthermore provides a method for producing metal strips by continuous casting and rolling, wherein a metal strip first is cast in a casting machine, then, depending on plant configuration, is rolled, subsequently is transported through a furnace in a conveying direction and fed into a downstream rolling mill. In case of a production malfunction, a segment of the metal strip is separated in a discharge section inside a housing of the furnace and is subsequently discharged from the discharge section of the furnace, in particular discharged laterally out of the furnace.

The invention is based on the essential finding that a metal strip, in particular when a malfunction occurs, can be severed or separated immediately inside the housing of the furnace, followed by a discharge of such a separated segment of the metal strip from the furnace. The first internal cutting apparatus and the second internal cutting apparatus are provided inside the housing of the furnace for this purpose. Said internal cutting apparatuses in particular can be actuated simultaneously such as to separate a segment of the metal strip located between the internal cutting apparatuses inside the furnace. Alternatively, these two internal cutting apparatuses can also be actuated consecutively, which then also results in the separating of a segment of the metal strip located between the internal cutting apparatuses. In this respect, such a separating of a segment of the metal strip inside the furnace can be conducted regardless whether a transporting apparatus or a roller table of a casting-rolling plant is occupied outside of the furnace and in close proximity to the same. This makes it possible, in particular in the case of a malfunction, to quickly discharge separated segments of the metal strip, whereby a cooling off of the material outside of a furnace is prevented or at least reduced.

In an advantageous development of the invention, the housing of the furnace has a discharge section, from which a separated segment of the metal strip can be discharged in a discharging direction. Herein, the internal cutting apparatuses are designed such that they separate the metal strip at an angle to the conveying direction inside the furnace, such that a separated segment of the metal strip can then be conveyed out of the furnace or its discharge section without entanglement or similar complications. Said cutting of the metal strip at an angle inside the furnace is conducted in such a manner that the cuts generated by the internal cutting apparatuses confine respective angles in the metal strip in relation to the discharging direction, which are between 3'-30', preferably between 5'-15°. Herein, the angle of the cut generated with the first internal cutting apparatus is inclined against the conveying direction of the metal strip, whereas the angle of the cut generated with the second internal cutting apparatus is inclined in the direction of the conveying direction of the metal strip. Due to this, the cuts extend in the shape of the sides of a trapezoid open to the outside, or an "open wedge," thus facilitating the unloading or discharging of a separated segment of the metal strip from the furnace.

Preferably, the discharging of a separated segment of the metal strip from the furnace is, according to the present invention, conducted in a lateral section of said furnace, that is, laterally out of the housing of the furnace. For this purpose, the discharge section of the housing can have an opening, such that a separated segment of the metal strip can be unloaded from the furnace through this opening.

According to an alternative embodiment of the invention, it also is possible to discharge a separated segment of the metal strip out upwardly.

During the operation of the furnace or of a device for producing metal strips by continuous casting and rolling, heat loss can be prevented by means of a heat-insulating hood, which is provided adjacent to the opening in the discharge section of the housing. Should a malfunction occur and—as explained previously—should a separated segment be discharged from the furnace, the heat-insulating hood is raised or opened during this process, for example, by use of an automatic hatch or similar cover, which is pushed by the segment of the metal strip being unloaded or is operated by a motor.

According to an advantageous embodiment of the invention, a discharge device is provided in the area of the opening of the housing, by means of which a separated segment of a metal strip is discharged from the housing of the furnace. Such a discharge device can comprise rollers arranged in the housing of the furnace, for example, which can be raised relative to an adjacent roller table to discharge a separated segment of the metal strip from the housing. Additionally and/or alternatively, the discharge device can have a support arm, a track element, a sliding device and/or a tilt apparatus, by means of which a separated segment of the metal strip can be discharged from the housing of the furnace.

If the discharge device is provided in the form of a track element, such a track element can be designed between the two internal cutting apparatuses and can be moveable in the discharging direction. Therein, the joint of the track element to the housing of the furnace can be designed at a right angle. If the joint is designed at an angle—as seen in a top view of the furnace—a lateral movement or sliding of the track element along or in the discharging direction is facilitated.

In an advantageous development of the invention, at least the first internal cutting apparatus or at least the second internal cutting apparatus, preferably also both internal cutting apparatuses, are designed in the form of a torch, in the form of a laser cutting device or in the form a purely mechanical cutting apparatus. Regardless of these various options for the design of the internal cutting apparatuses, it always is ensured that the cuts generated by said internal cutting apparatuses extend at an angle in relation to the discharging direction and—as explained previously—confine an angle between 3°-30°, preferably between 5°-15°. Such inclined cuts facilitate the discharging of separated segments of the metal strip from the furnace.

In the device according to the invention, the discharging of separated segments of the metal strip furthermore is optimized by the fact that a roller table for unloading, a chute and/or a stacking apparatus are arranged adjacent to the lateral opening in the housing of the furnace. These make it possible to consecutively unload multiple pieces of material, that is, separated segments of the metal strip, out of the furnace. Thereby, a cooling down of the strip material in a casting-rolling plant is prevented or at least reduced.

In an advantageous development of the device according to the invention, a crushing apparatus can be provided adjacent to the lateral opening in the housing of the furnace, by means of which crushing apparatus segments of the metal strips, which have been unloaded from the furnace, can be crushed. Such a crushing apparatus can be designed in the form of a scrap shear, for example. Hereby, multiple separated segments of the metal strip can be crushed after they have been unloaded out of the housing of the furnace, in particular unloaded laterally, whereby the required space for receiving these unloaded segments is advantageously reduced.

The present invention makes it possible in an advantageous manner to quickly unload or convey strip material out of a furnace, in particular one in the form of a roller hearth furnace, in the case of a malfunction, in particular the malfunction of a casting-rolling plant, wherein said unloading or conveying quickly restores the production readiness of the casting-rolling plant after the malfunction is rectified.

BRIEF DESCRIPTION OF THE DRAWINGS

Further advantages and aspects of the present invention can be found in the following exemplary embodiments, which are described in detail using schematically simplified drawings.

The drawings show.

DETAILED DESCRIPTION

Figure 1:
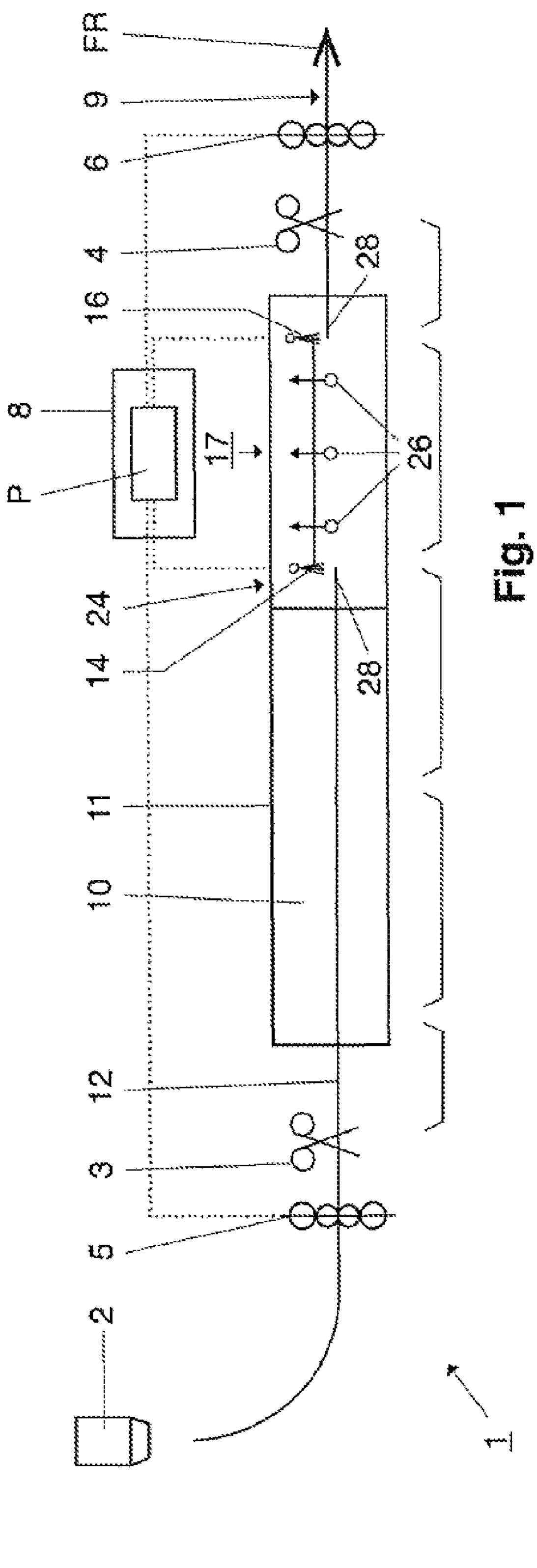
FIG. 1 A schematic side view of a device according to the invention in the form of a casting-rolling plant.

In the following, preferred embodiments of an inventive device 1 for producing metal strips by continuous casting and rolling, an associated furnace 10 and a corresponding method are explained in detail in reference to FIGS. 1-5. Identical characteristics in the respective drawings are marked with identical reference numbers. It must be pointed out here that this drawing shows a simplification and in particular has not been prepared to scale.

The inventive furnace 10 serves to heat metal strips and comprises a housing 11, wherein a metal strip 12 can be transported through the housing 11 in a conveying direction FR. A first internal cutting apparatus 14 and a second internal cutting apparatus 16 are provided inside the housing 11. Herein, the second internal cutting apparatus 16 is arranged at a distance to the first internal cutting apparatus 14 and arranged downstream from the first internal cutting apparatus 14 in a conveying direction FR of the metal strip 12.

The furnace 10 is shown schematically in a side view in FIG. 1, as a part of the inventive device 1 or a corresponding casting-rolling plant. The reference marker "FR" symbolizes the conveying direction, along which a metal strip 12 can be transported or conveyed through the housing 11 of the furnace 10 (in the drawing, from the left side to the right side).

Figure 2:
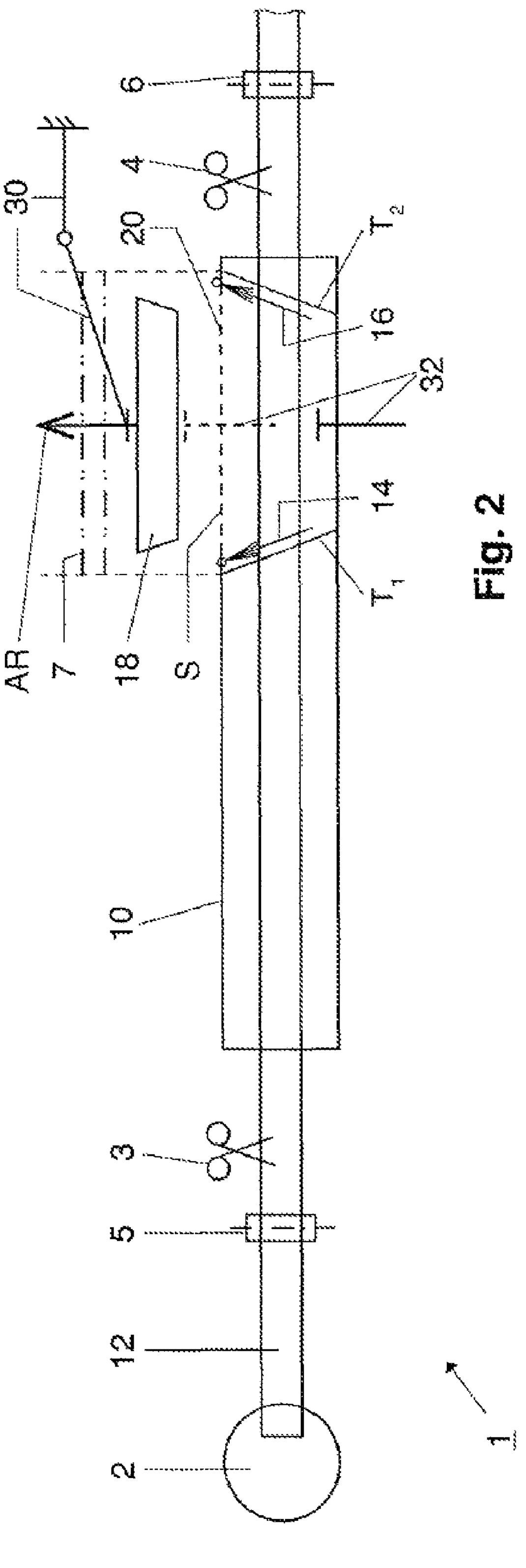
FIG. 2 A top view of the device of FIG. 1.
Figure 3:
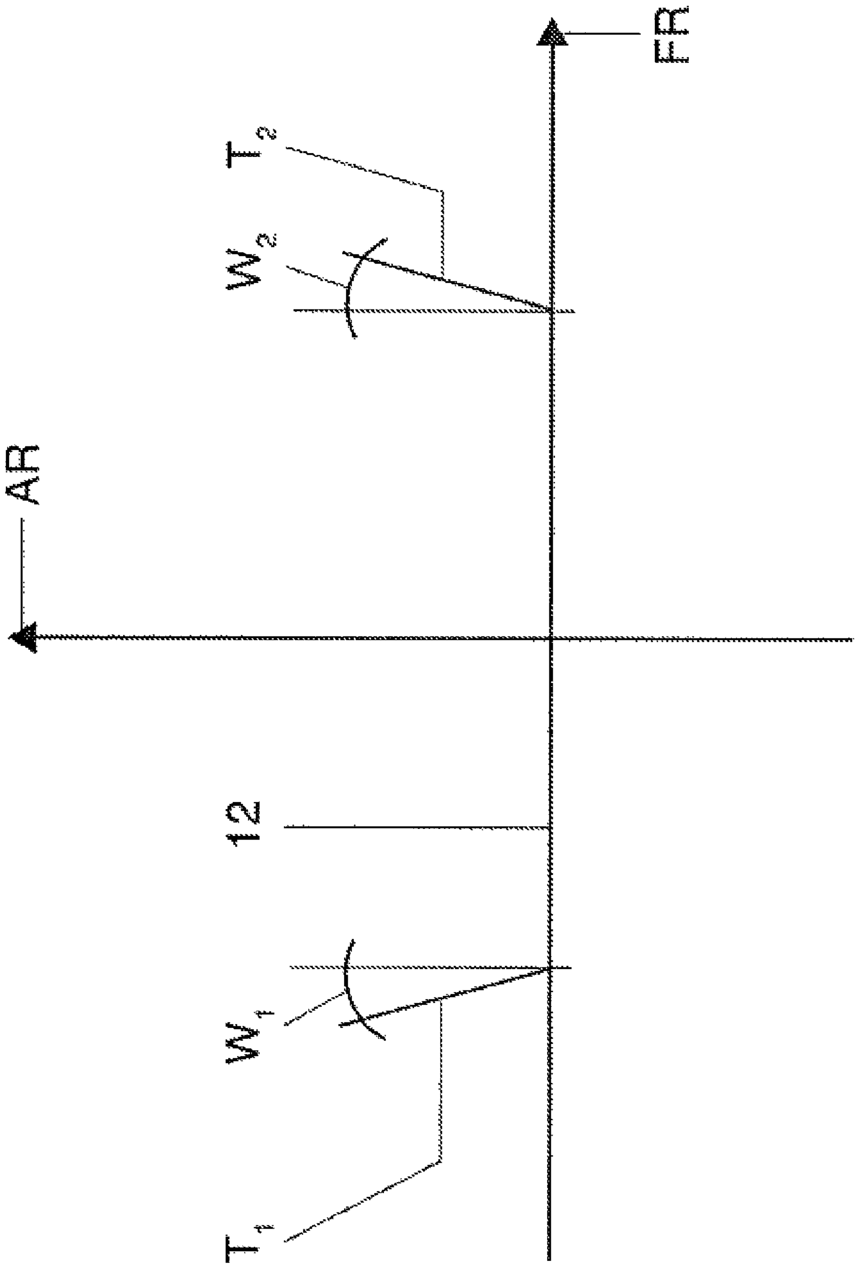
FIG. 3 A visualization of cuts, which are generated for a metal strip with the device of FIG. 1 in its furnace.

The two internal cutting apparatuses 14 and 16 of the furnace 10 can be designed such that they can be actuated simultaneously, thereby separating a segment 18 of the metal strip 12 located between the internal cutting apparatuses 14 and 16 inside the furnace 10. Alternatively, these two internal cutting apparatuses 14 and 16 can also be actuated consecutively, which then also results in the separating of a segment of the metal strip 12 located between the internal cutting apparatuses. The top view of the furnace 10 or of the device 1 according to FIG. 2 shows such a separated element 18 of the metal strip 12 as it is unloaded laterally from the furnace 10. For this purpose, the housing 11 of the furnace 10 has a discharge section 17, preferably in a lateral area S of the housing 11. Herein, an opening 20 (indicated symbolically in FIG. 2 with a dashed line) is provided, from which a separated segment 18 of the metal strip 12 can be unloaded from the furnace 10.

The internal cutting apparatuses 14 and 16 are designed such that the cuts $T_1$ and $T_2$ generated by the same in the metal strip 12 respectively extend at an angle and respectively confine an angle between 3°-30°, preferably between 5°-15°, in relation to the discharge direction AR (cf. FIG. 2) in which a separated segment 18 of the metal strip 12 can be discharged from the discharge section 17 of the furnace 10. This relationship is clarified again in the representation in FIG. 3. The angle $W_1$ of the cut $T_1$ generated in the metal strip 12 with the first internal cutting apparatus 14 is inclined against the conveying direction FR of the metal strip 12. As a complement, the angle $W_2$ of the cut $T_2$ generated with the second internal cutting apparatus 16 is inclined in the direction of the conveying direction FR of the metal strip 12. This way, the cuts $T_1$ and $T_2$ and their angle to each other result in an "open wedge" in the direction of the discharge direction AR, thus facilitating the discharging of a segment 18 of the metal strip 12, which has been separated between the internal cutting apparatuses 14 and 16, from the furnace 10, because this separated segment 18 will not get jammed or caught.

FIG. 4 again shows a top view of the furnace 10. In this view, it is apparent that a heat-insulating hood 22 is provided adjacent to the opening 20, which is designed in the lateral area S of the housing 11 of the furnace 10. This hood 22 also can be split at an angle in the discharge section 17, such that the sealing effect of this hood 22 can be implemented more easily, for example, by use of overlapping edges.

A discharge device 24 (FIG. 1) for the furnace 10 is provided in the area of the opening 20 of the housing 11, wherein said discharge device 24 makes it possible to discharge a separated segment 18 of the metal strip 12 out of the furnace 10. The discharge device 24 has rollers 26, which are arranged inside the housing 11 of the furnace 10, said rollers 26 being able to be raised relative to an adjacent roller table 28 to discharge a separated segment 18 of the metal strip 12 out of the housing 11 of the furnace 10. Additionally, the discharge device 24 can also comprise a support arm 30 (cf. FIG. 2), by means of which a separated segment 18 of the metal strip 12 can be received outside of the furnace 10. Furthermore, the discharge device 24 can also comprise a sliding device 32, which is symbolically shown as "T" in FIG. 2, both in an idle position (solid line) and in an operational position (dashed line), when it has pushed or discharged a separated segment 18 of the metal strip 12 from the housing 11 of the furnace 10.

The internal cutting apparatuses 14 and 16 of the furnace 10 preferably are designed as torches and will be referred to as torches in the following, wherein this reference term does not constitute a limitation.

Figure 4:
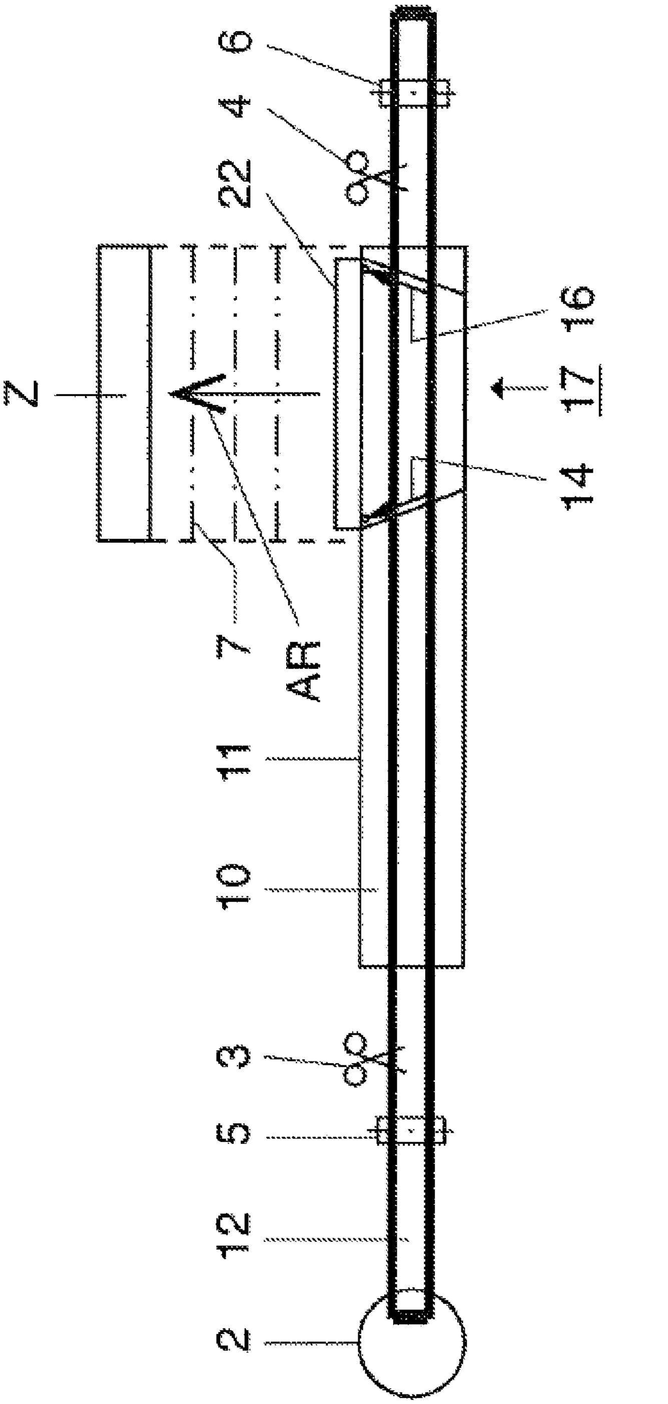
FIG. 4 A schematic top view of a device according to another embodiment.

The representation according to FIGS. 1, 2 and 4 clarifies the involvement of the inventive furnace 10 for a device 1 in the form of a casting-rolling plant. The device 1 comprises a casting machine 2, a first external cutting apparatus 3 and a second external cutting apparatus 4, wherein the furnace 10 is arranged between these external cutting apparatuses 3 and 4, and rolling mills 5 and 6, which also can be arranged on both sides of the furnace 10.

The top view according to FIGS. 2 and 4 clarifies that the device 1 furthermore has a unloading roller table 7 (indicated symbolically by double-dashed lines), by means of which a separated segment 18 of the metal strip 12 can be discharged or conveyed out of the furnace 10. As shown in FIG. 4, a crushing apparatus, for example in the form of a scrap shear, can be provided adjacent to the unloading roller table 7, by means of which crushing apparatus a segment 18 of the metal strip 12, which has been unloaded from the furnace 10, can be crushed or cut apart.

A fault monitoring system 8 (cf. FIG. 1) with a processing computer P is provided for the device 1, wherein the torches 14 and 16 of the furnace 10, and preferably also the first external cutting apparatus 3 and the second external cutting apparatus 4, are able to send and receive signals to/from the processing computer P (symbolized by dotted lines in FIG. 1). If a fault occurs during the continuous casting and rolling with the device 1, the torches 14 and 16 can be automatically actuated by the processing computer P of the fault monitoring system 8, in order to separate a segment 18 of the metal strip 12 inside the housing 11 of the furnace 10. In this context, it also is possible to automatically actuate the external cutting apparatuses 3 and 4 and/or the discharge device 24 with the processing computer P to discharge a separated segment 18 out of the furnace 10 in the desired manner, specifically in the discharge section 17 via the opening 20 provided in said section.

In FIG. 1, additional downstream apparatuses of the device 1 are symbolized with the reference number "9", wherein said apparatuses can be connected to the casting-rolling plant in the conveying direction FR of the metal strip 12.

The operating principle of the present invention is explained in the following in reference to FIG. 5, in which six steps 1-6 are shown as an example, which can be executed with the device 1 if a malfunction occurs in the casting-rolling plant.

In step 1 according to FIG. 5, the metal strip 12 is separated by means of the torches 14 and 16 inside the furnace 10, wherein subsequently the segment 18 of the metal strip 12 thus generated (referred to as piece "A" in FIG. 5) is conveyed laterally out of the discharge section 17 of the furnace 10. In this context, reference is made to the inclined cuts $T_1$ and $T_2$ generated by the torches 14 and 16, said cuts $T_1$ and $T_2$ having been explained previously in reference to FIG. 3. Thanks to these inclined cuts $T_1$ and $T_2$, it is possible to laterally discharge a separated segment 18 of the metal strip 12 (or piece A) without said segment getting jammed.

Figure 5:
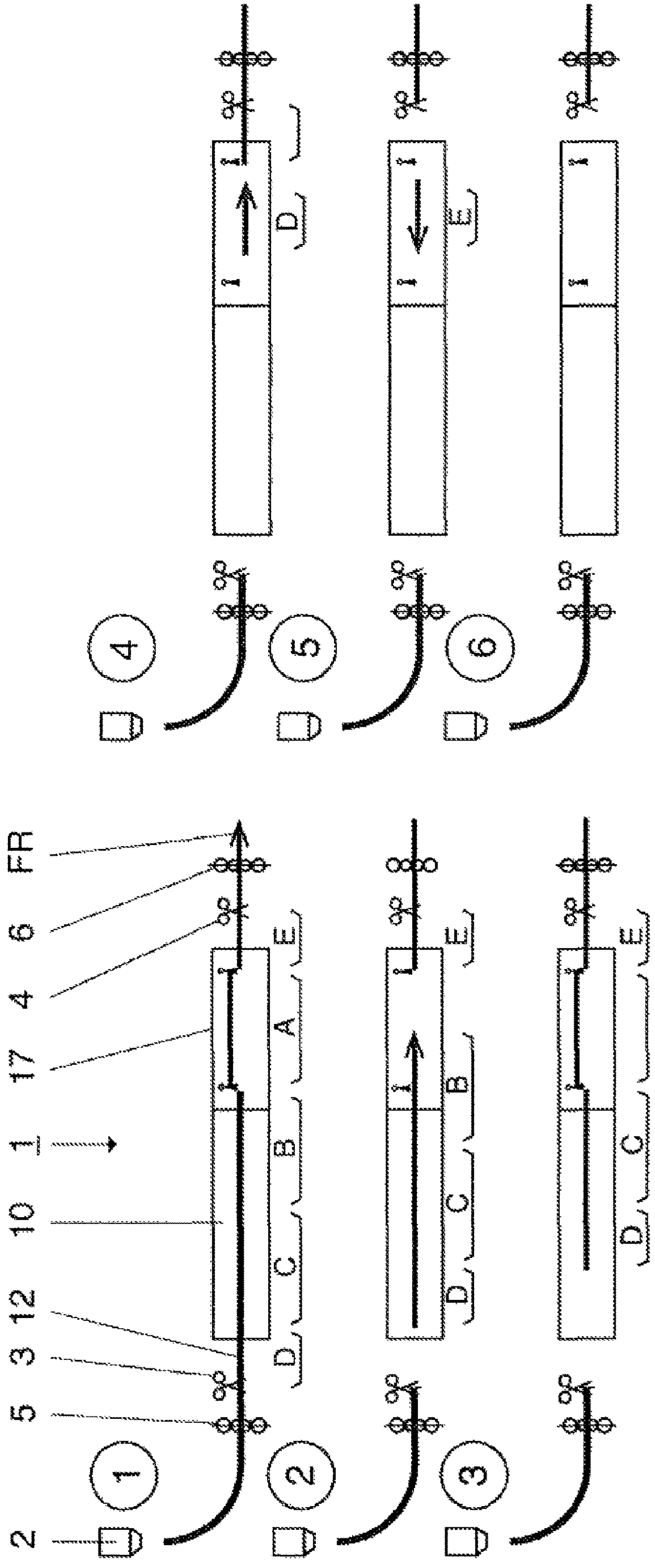
FIG. 5 Schematic side views of a device according to the invention, with various sequences of the steps 1-6.

In step 2 according to FIG. 5, the metal strip 12 is cut upstream of the furnace 10 by means of the first external cutting apparatus 3, wherein then the (still connected) pieces B, C and D of the metal strip 12 are transported along the conveying direction FR toward the discharge section 17. In step 3 according to FIG. 5, the piece B of the metal strip 12 is then cut or separated by means of the two torches 14 and 16 and is subsequently discharged laterally out of the discharge section 17. This also is repeated with the piece C of the metal strip 12. Should the material length be greater than that shown in FIG. 5, additional pieces C' of the metal strip 12 are transported in the direction of the discharge section 17, following the same sequence as described previously, where they are cut or separated by the two torches 14 and 16 and subsequently discharged laterally out of the furnace 10.

In step 4 according to FIG. 5, the remaining piece D of the metal strip 12 is transported toward the discharge section 17 and is subsequently discharged laterally out of the discharge section 17 in the manner described previously.

In step 5 according to FIG. 5, the metal strip 12 is cut by means of the second external cutting apparatus 4, which is arranged downstream of the furnace 10 in the conveying direction FR of the metal strip 12. Subsequently, the piece E of the metal strip 12 thus separated is transported against the conveying direction FR into the discharge section 17 of the furnace 10 and is then conveyed laterally out of the furnace 10. Should the material length of the piece E be greater than that shown in FIG. 5, additional pieces E' are transported into the discharge section 17—analogous to step 3—where they are cut or separated by the two torches 14 and 16 and subsequently discharged laterally out of the discharge section 17.

In step 6 according to FIG. 5, the section of the device 1 between the external cutting apparatuses 3 and 4 is "emptied," that is, cleared of the metal strip 12 without requiring transport apparatuses located before or after the material (that is, upstream or downstream of the furnace 10).

The sequence of steps described above in reference to FIG. 5 also describes a method according to the present invention.

LIST OF REFERENCE NUMBERS

1 Device
2 Casting machine
3 First external cutting apparatus
4 Second external cutting apparatus
5 Rolling mill
6 Rolling mill
7 Unloading roller table
8 Fault monitoring system
9 Subsequent apparatuses (of the device 1)
10 Furnace
11 Housing
12 Metal strip
14 First internal cutting apparatus (or torch)
16 Second internal cutting apparatus (or torch)
17 Discharge section (of the furnace 10)
18 Segment of the metal strip (separated by the cutting apparatuses 14+16)
20 Opening (in the housing 12 of the furnace 10)
22 Heat-insulating hood
24 Discharge device
26 Rollers (inside the housing 12)
28 Roller table (adjacent to the rollers 24)
30 Support arm
32 Sliding device
AR Discharging direction (for discharging a segment)
FR Conveying direction
P Processing computer (of the fault monitoring system)
S Lateral section (of the housing 12)
$T_1$ Cut (generated by the first cutting apparatus 14)
$T_2$ Cut (generated by the second cutting apparatus 16)
$W_1$ Angle (between cut $T_1$ and discharging direction A)
$W_2$ Angle (between cut $T_2$ and discharging direction A)
Z Crushing apparatus

The invention claimed is:

1. A furnace for heating metal strips, comprising:

a housing, wherein a metal strip is transported through the housing in a conveying direction, a first internal cutting apparatus and a second internal cutting apparatus are provided inside the housing, the second internal cutting apparatus is arranged at a distance to the first internal cutting apparatus and arranged downstream from the first internal cutting apparatus in the conveying direction of the metal strip, said internal cutting apparatuses are actuated simultaneously such as to separate a segment of the metal strip located between the internal cutting apparatuses inside the furnace, the housing has a discharge section with an opening designed in a lateral area of the housing or in a top cover of the housing, such that the separated segment of the metal strip is discharged via the opening out of the furnace in a discharging direction, which extends orthogonally to the conveying direction, the internal cutting apparatuses are angled relative to one another with respect to the discharging direction such that a simultaneous first cut generated by the first internal cutting apparatus that defines a first end of the separated segment and a simultaneous second cut generated by the second internal cutting apparatus that defines a second end of separated segment respectively confine an angle between 5°-15° in relation to the discharging direction in which the separated segment of the metal strip is discharged out of the furnace, and such that the angle of the cut generated with the first internal cutting apparatus is inclined against the conveying direction of the metal strip and the angle of the cut generated with the second internal cutting apparatus is inclined in the conveying direction of the metal strip.

2. The furnace according to claim 1, wherein a heat-insulating hood is provided adjacent to the opening.

3. The furnace according to claim 1, wherein a discharge device is provided in the area of the opening of the housing, by means of which discharge device the separated segment of the metal strip is discharged out of the housing of the furnace.

4. The furnace according to claim 3, wherein the discharge device comprises rollers arranged in the housing of the furnace, said rollers being able to be raised relative to an adjacent roller table to discharge the separated segment of the metal strip from the housing.

5. The furnace according to claim 3, wherein the discharge device has a support arm and a sliding device, by means of which the separated segment of the metal strip is discharged from the housing of the furnace, wherein the sliding device is designed between the two internal cutting apparatuses and is configured to move in the discharging direction.

6. The furnace according to claim 1, wherein at least the first internal cutting apparatus or at least the second internal cutting apparatus is designed in the form of a torch.

7. The furnace according to claim 1, wherein at least the first internal cutting apparatus or at least the second internal cutting apparatus is designed in the form of a laser cutting device.

8. The furnace according to claim 1, wherein at least the first internal cutting apparatus or at least the second internal cutting apparatus is designed in the form of a mechanical cutting apparatus.

9. The furnace according to claim 1, wherein the furnace is designed as a roller hearth furnace.

* * * * *